March 15, 1932.    J. MITTNACHT    1,849,847
SYSTEM OF CONTROL
Filed Aug. 9, 1929
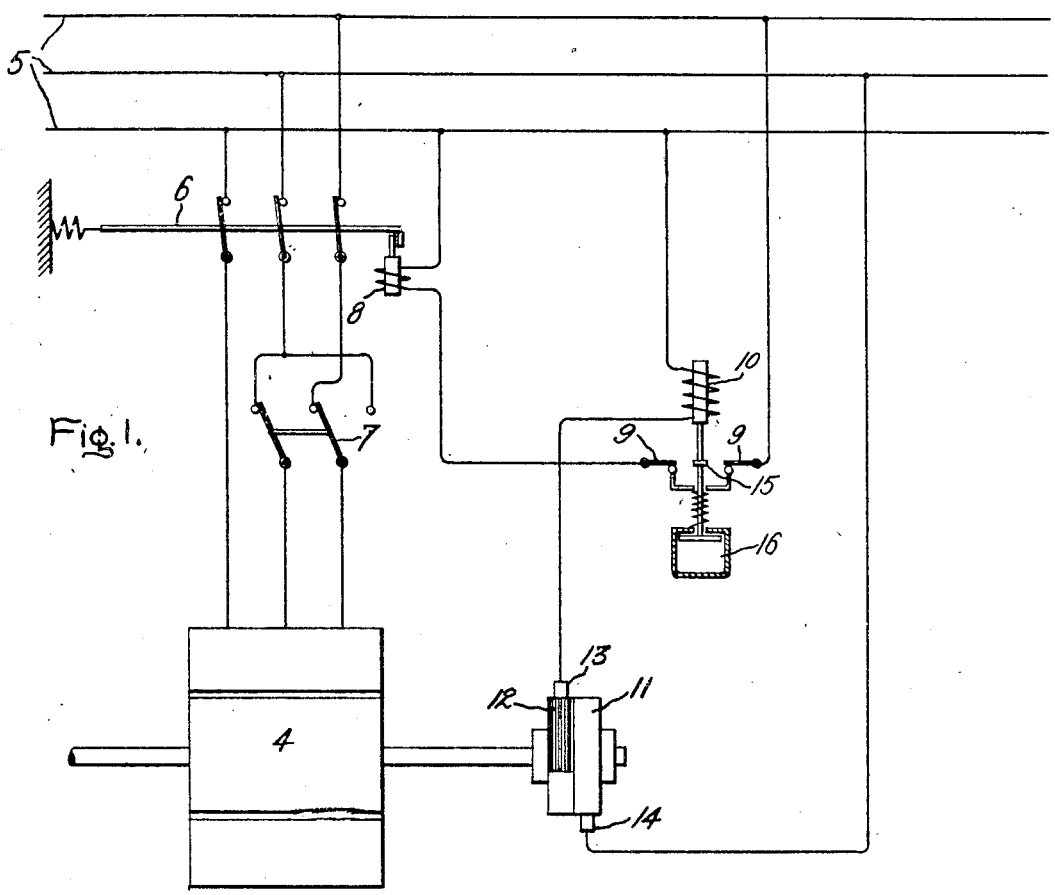
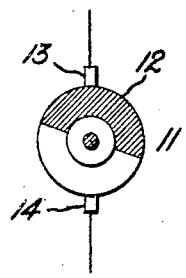
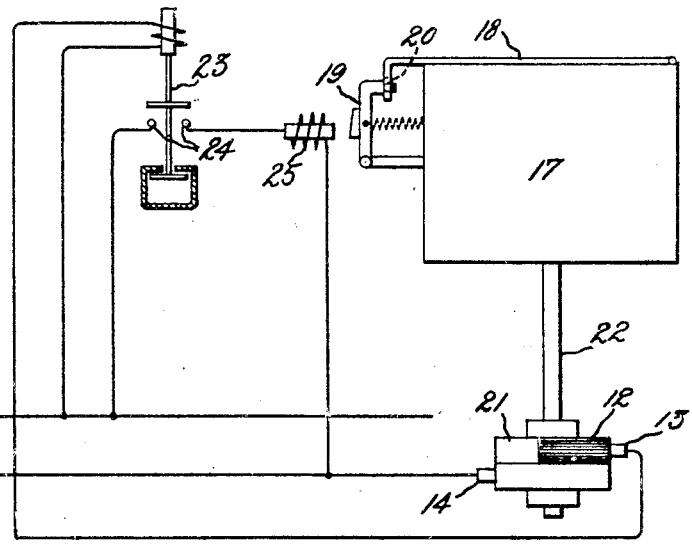
Inventor:
Josef Mittnacht,
by Charles E. Tulla
His Attorney.

Patented Mar. 15, 1932

1,849,847

UNITED STATES PATENT OFFICE

JOSEF MITTNACHT, OF BERLIN, GERMANY, ASSIGNOR TO GENERAL ELECTRIC COMPANY, A CORPORATION OF NEW YORK

SYSTEM OF CONTROL

Application filed August 9, 1929, Serial No. 384,758, and in Germany November 16, 1928.

My invention relates to systems for controlling the operations of machines, more particularly to systems for controlling machines in accordance with their instantaneous speeds, and has for an object the provision of a simple and reliable system of the kind for initiating a controlling operation of a machine at a predetermined speed thereof.

In illustrating my invention in one form thereof, I have shown it as embodied in a system for controlling the braking and stopping operations of an electric motor.

In carrying my invention into effect in one form thereof, I provide means for interrupting a control circuit at a frequency dependent upon the speed of the motor, and a device responsive to the frequency of these interruptions for initiating a controlling operation of the motor.

For a better and more complete understanding of my invention, reference should now be had to the following specification and to the accompanying drawings in which Fig. 1 is a simple diagrammatic representation of my invention as embodied in a system for controlling the stopping operation of an electric motor; Fig. 2 is a mechanical detail; and Fig. 3 is a diagrammatic representation of an embodiment of my invention in a system for controlling an operating condition of a power driven washing machine.

Referring now to the drawings, a suitable electric motor, such as the three phase induction motor 4 shown in the drawings, is arranged to be supplied from a suitable source of supply, such as that represented by the three phase supply lines 5, through the contacts of a line contactor 6. A change-over switch 7 serves in a well-known manner for reversing the direction of rotation of the rotating field of the motor for the purpose of braking the machine. This operation of braking an electric motor by applying reverse power connections is known to workers skilled in the art as "plugging" the motor. The line contactor 6 is provided with an under-voltage release and the circuit of the under-voltage magnet 8 extends through the contacts 9 of a time relay 10. The winding of the time relay 10 is connected to two sides of the three phase supply lines 5 through an interrupter 11 which is arranged on the motor shaft or upon an auxiliary shaft coupled with the latter.

As may be seen in Fig. 2, the interrupter 11 consists of a slip ring body secured to the shaft of the motor but suitably insulated therefrom, one-half of which consists in part of an insulating piece 12. The brushes 13 and 14 make contact with the periphery of the interrupter and close or open the circuit of the time relay 10 according to the instantaneous position of the insulating piece 12 of the interrupter 11. The time relay 10 is so constructed that when energized it maintains the contacts 9 closed and when it is de-energized its armature is permitted to descend under the attraction of gravity, the contacts still remaining closed due to the lost motion between the contact bridging member and the collar 15 on the rod that connects the core member of relay 10 with a time delay device such as the dash pot 16 as shown in the drawings. Persons skilled in the art will understand that the damping action of the dash pot may be adjusted as desired to permit the contacts 9 to be opened at the expiration of a predetermined interval after the de-energization of the energizing coil of relay 10 provided that the energization for that coil is not reestablished within that period.

With the above understanding of the elements and apparatus comprising my invention and their association with each other and with the parts in the position as shown in the drawings with the line switch closed, the motor 4 will be rotating in a predetermined direction depending upon whether the change-over switch 7 is actuated to the right or to the left-hand position. The circuit of the time relay 10, the upward motion of which is undamped, as indicated in the drawings, is interrupted for a brief interval with each rotation of the interrupter 11. The current impulses, however, follow in such rapid succession that the relay armature remains picked up and the contacts 9 are accordingly maintained closed. In consequence the under-voltage magnet 8 is energized and holds the line contactor 6 in the closed position shown. Should it be desired to stop the motor 4, the change-over switch 7 will be actuated to the opposite position from that shown to connect the terminals of the stator winding of the motor with the source 5 for reverse power connections therewith and consequently for operation of the motor in a reverse direction of rotation. The result of this sudden application of reverse power connections to the stator of the motor is to reverse the direction of the rotating field and thereby to produce a powerful braking effect as is well understood by workers skilled in the art. With diminishing speed the duration of each interruption of the current flowing in the winding of relay 10 becomes increasingly greater so that the relay armature descends further with each succeeding interruption. However, with each reestablishment of the circuit by the interrupter, the armature returns momentarily to its upper position and thus the contacts 9 are finally opened only when the speed of the motor has become so reduced that the duration of an interruption of the circuit is greater than the time adjustment for the descent of the time relay 10. Thus, it will be seen that it is possible by adjusting the damping of the time relay 10 to effect the opening of the contacts 9 and to effect the tripping of the line switch 6 at any desired low value of motor speed and particularly at speeds near the stopping point.

The invention is also particularly advantageous when a machine is stopped, for releasing the locking devices which may be provided for the prevention of accidents when the machine is running. These precautions are particularly necessary in the case of centrifugal machines and especially with centrifugal washing machines. The cover of a washing machine must be kept closed until a machine has been brought to rest.

Fig. 3 shows a schematic diagram of such a locking device. The centrifugal machine 17, which is driven by a motor (not shown), is closed by means of a cover 18. During the operation of the centrifugal machine, the pawl 19 latches in the slot 20 and thereby prevents the cover from being raised. A current interrupter 21, such as that already described in connection with Figs. 1 and 2, is provided on the drive shaft 22. When the speed of the centrifugal machine has been reduced to such a predetermined value that the cover can be opened without danger, the relay 23 permits the bridging member to close the contacts 24. An energizing circuit for the electromagnet 25 is thereby established attracting and unlatching the pawl 19 and thereby leaving the cover free to be opened.

While I have described my invention as embodied in particular elements associated with each other in a particular way and operating in a predetermined manner, I would have it understood that the invention is not limited to the particular devices or connections shown since alterations and changes in the system may be made by persons skilled in the art without departing from the spirit of the invention or from the scope of the annexed claims.

What I claim as new and desire to secure by Letters Patent of the United States is:

1. A control system for a rotating machine comprising means for stopping said machine, a control circuit, means associated with said machine for intermittently interrupting said control circuit, and means responsive to the frequency of said interruptions for controlling said stopping means.

2. A system of control comprising a rotating machine, a control circuit, means driven by said machine for interrupting said control circuit at a frequency corresponding with the speed of said machine, and a relay responsive to the frequency of said circuit interruptions for controlling said machine.

3. In combination, an electric motor, a control circuit, means associated with said motor for interrupting said circuit for an interval of time proportional to the speed of said motor, and means responsive only to an interruption of predetermined duration for initiating a controlling operation of said motor.

4. In combination, an electric motor, means for stopping said motor, a control circuit, means associated with said motor for intermittently interrupting said circuit, and means responsive to the frequency of interruptions for actuating said stopping means.

5. A motor control system comprising an electric motor, means for stopping said motor, a control circuit, means for intermittently interrupting said control circuit at a frequency proportional to the speed of the motor, and means responsive to the frequency of interruption of said circuit for operating said stopping means.

6. In a system of motor control, a motor, an electric control circuit, a commutator interrupter driven by said motor for interrupting said circuit at a frequency dependent upon the instantaneous speed of the motor, and a frequency relay included in said circuit responsive to the frequency of said interruptions for controlling said electric motor.

7. A system for controlling the operation of electric motors comprising a motor, a line contactor for connecting said motor with a source of supply, and a control circuit including a commutator interrupter for interrupting said circuit at a frequency proportional to the speed of said motor and a frequency relay responsive to the frequency of said interruptions for controlling the operation of said line contactor.

8. In a motor control system, a motor, a line contactor arranged when energized to connect said motor with a source of supply, a control circuit, means for interrupting said circuit at a frequency dependent upon the speed of said motor, a reversing switch for plugging said motor, and a relay responsive to the duration of an interruption of said circuit for deenergizing said line contactor, thereby to disconnect said motor from said source at approximately zero speed of said motor.

9. A braking system for an asynchronous motor comprising a line contactor arranged when energized to connect the motor with a source of supply, a control circuit, a commutator interrupter driven in accordance with the speed of the motor for interrupting said circuit at a frequency proportional to said speed, a second control circuit for controlling the operation of said line contactor, a reversing switch for effecting braking of said motor by "plugging", and a control relay comprising elements including a lost motion device and a time delay device for rendering said relay responsive to an interruption of a predetermined duration thereby to open said second circuit and to deenergize said line contactor and stop said motor at substantially zero speed thereof.

10. In a motor control system, an electric motor, an electromagnetic switching device for connecting and disconnecting said motor and a source of supply, means for reversing the connections of said motor to said source to plug said motor to rest, a control circuit, an interrupter driven by said motor for interrupting said circuit at a frequency proportional to the speed of said motor and for intervals of time inversely proportional to the decreasing speed of said motor, and a relay responsive to an interruption of said circuit of predetermined duration for causing said switching device to disconnect said motor from said source.

In witness whereof, I have hereunto set my hand this 23rd day of July, 1929.

JOS. MITTNACHT.